(12) United States Patent
Lauer et al.

(10) Patent No.: US 7,542,743 B2
(45) Date of Patent: Jun. 2, 2009

(54) MAXIMUM LIKELIHOOD DETECTION FOR MIMO RECEIVERS

(75) Inventors: Joseph Paul Lauer, North Reading, MA (US); Joachim S. Hammerschmidt, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 484 days.

(21) Appl. No.: 11/525,270

(22) Filed: Sep. 22, 2006

(65) Prior Publication Data

US 2007/0077969 A1      Apr. 5, 2007

Related U.S. Application Data

(60) Provisional application No. 60/722,844, filed on Sep. 30, 2005.

(51) Int. Cl.
*H04B 7/08* (2006.01)

(52) U.S. Cl. .................. 455/132; 455/226.1; 455/101; 455/562.1; 375/267

(58) Field of Classification Search ................. 455/500, 455/561, 562.1, 101, 103, 296, 226.1; 375/267, 375/260, 299
See application file for complete search history.

(56) References Cited

U.S. PATENT DOCUMENTS

| 7,190,734 | B2 * | 3/2007 | Giannakis et al. | ........... 375/267 |
| 2004/0242179 | A1 * | 12/2004 | Onggosanusi et al. | ....... 455/296 |
| 2006/0104390 | A1 | 5/2006 | Graef et al. | |
| 2006/0209977 | A1 | 9/2006 | Graef et al. | |
| 2006/0209994 | A1 | 9/2006 | Graef et al. | |

* cited by examiner

*Primary Examiner*—Tony T Nguyen
(74) *Attorney, Agent, or Firm*—Garlick Harrison & Markison

(57) ABSTRACT

Maximum likelihood detection of signals in a MIMO receiver. A system transformation is obtained by selecting a weighting matrix that when linearly transforming a channel utilized for wireless communication, results in a particular transformed triangular matrix. The weighting matrix is then used to provide a transformed vector for a received signal that allows a search in one constellation. In searching the constellation recursion values are used to calculate the Euclidean distances between set points of the constellation and the location on the constellation corresponding to the received signal for both bit values 0 and 1. Minimum Euclidean distances are determined for bit values 0 and 1 and the difference of the minimum Euclidean distances is used to compute the maximum likelihood value for bits contained in the received signal.

19 Claims, 9 Drawing Sheets

MAXIMUM LIKELIHOOD DETECTION FOR MIMO RECEIVERS

PRIORITY INFORMATION

This application claims the benefit of priority to U.S. Provisional Patent Application Ser. No. 60/722,844; filed Sep. 30, 2005; and titled "Maximum likelihood detection for MIMO receivers," which is incorporated herein by reference.

BACKGROUND OF THE INVENTION

1. Technical Field of the Invention

The embodiments of the invention relate to communications and more particularly to data detection in a receiver of a multiple-input and multiple-output system.

2. Description of Related Art

Communication systems are known to support wireless and wire lined communications between wireless and/or wire lined communication devices. Such communication systems range from national and/or international cellular telephone systems, the Internet and to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network, via the Internet, and/or via some other wide area network.

For each wireless communication device to participate in wireless communications, it typically includes a built-in radio transceiver (i.e., receiver and transmitter) or is coupled to an associated radio transceiver (e.g., a station for in-home and/or in-building wireless communication networks, RF modem, etc.). The receiver may be coupled to an antenna and the receiver may include a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillators to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The transmitter typically includes a data modulation stage, one or more intermediate frequency stages, and a power amplifier stage. The data modulation stage converts raw data into baseband signals in accordance with a particular wireless communication standard. The one or more intermediate frequency stages mix the baseband signals with one or more local oscillators to produce RF signals. The power amplifier amplifies the RF signals prior to transmission via an antenna.

In traditional wireless systems, the transmitter may include one antenna for transmitting the RF signals, which are received by a single antenna, or multiple antennas, of a receiver. When the receiver includes two or more antennas, the receiver generally selects one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and, more recently, multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each convert a corresponding portion of baseband signals into RF signals, which are transmitted via corresponding antennas to a receiver. The receiver includes a single receiver path that receives the multiple RF signals from the transmitter. In this instance, the receiver uses techniques to combine the multiple RF signals into one signal for further processing.

For a multiple-input-multiple-output (MIMO) wireless communication, the transmitter and receiver each include multiple paths. In such a communication, the transmitter parallel processes data using a spatial and time/frequency transformation function to produce two or more encoded streams of data. The transmitter includes multiple transmission paths to convert each stream of data into multiple RF signals. The receiver receives the multiple RF signals via multiple receiver paths that recapture the streams of data utilizing a spatial and time/frequency detection function. Typically, the signal on each receive antenna is a superposition of the various transmit streams. The captured receive signals are jointly processed to recover the original data.

SISO transmission is typically used in the Wireless Local Area Networking (WLAN) standards IEEE 802.11, 802.11a, 802.11b, and 802.11g, whereas the IEEE 802.11n standard allows for SIMO, MISO, and MIMO modes as well. In these additional multiple antenna modes (SIMO, MISO, MIMO), the presence of multiple transmit streams and/or receiver paths may lead to significant detection complexity increases as compared with SISO detection. This is particularly true when very high performance detection is desired, such as Maximum Likelihood Detection (ML). In ML, the receiver searches over all possible noise-less receive signals to find the best match with the actual received signals. This process is generally computationally expensive, because the number of operations is typically exponential in the number of transmit streams, making implementation in hardware difficult to achieve. For example, a simple 64 constellation point search in a SISO system may expand to a $64^2$ (4096) constellation point search when the same signaling alphabet used in the SISO system is transmitted on each stream in a 2×2 MIMO system.

Accordingly, by providing a particular technique to reduce complexity in detecting received signals in a MIMO receiver, signal detection circuitry may be readily implemented in hardware.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that implement baseband processing in a digital communication device. While the description is for a wireless communication device, the invention may alternatively be used in a wireline digital communication device.

Figure 1:
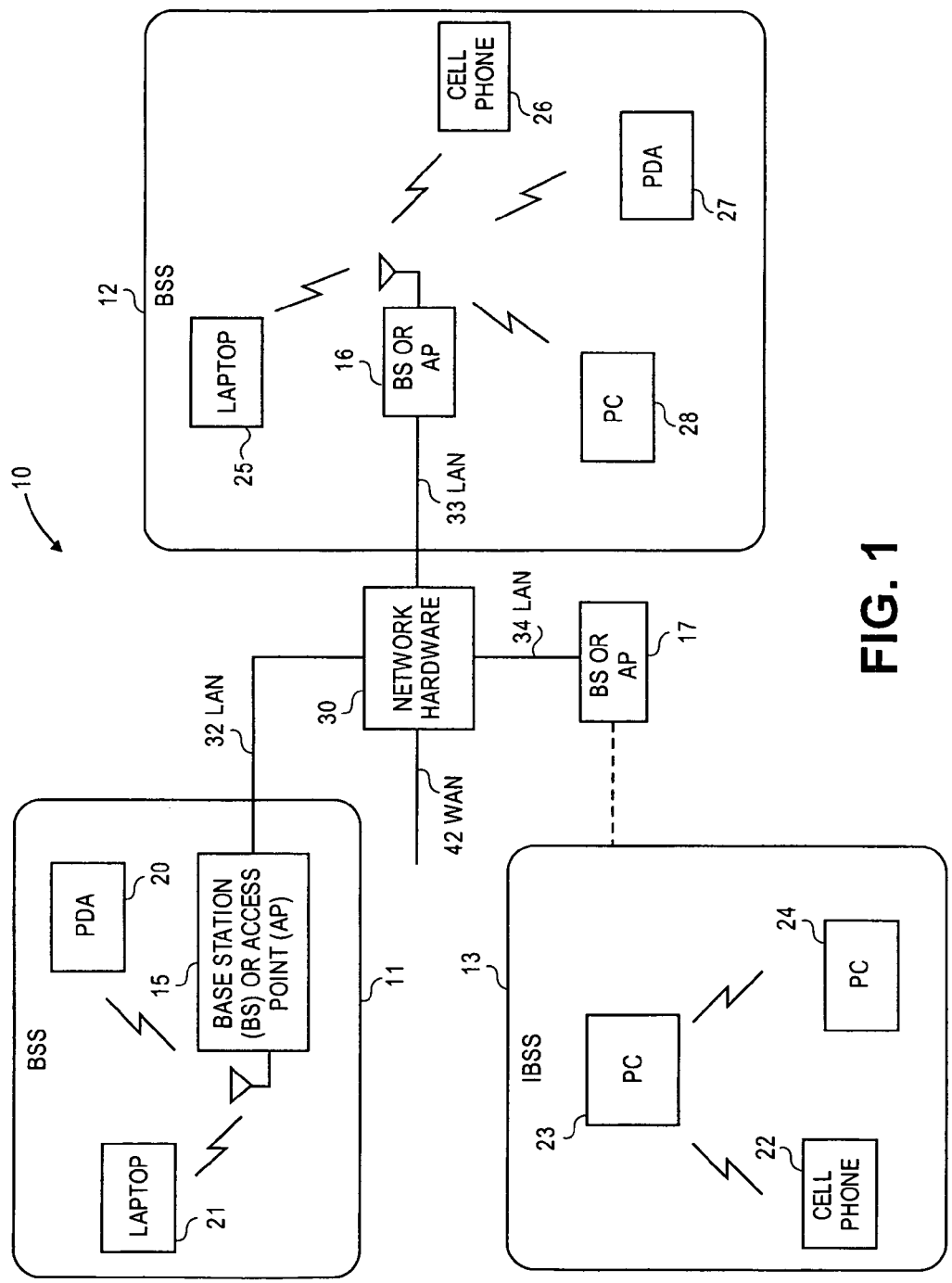
FIG. 1 is a block schematic diagram illustrating a wireless communication system in accordance with one embodiment of the present invention.

FIG. 1 is a schematic block diagram illustrating a communication system 10 that includes a plurality of base stations and/or access points (BS/AP) 15, 16, 17, a plurality of wireless communication devices 20-28 and a network hardware component 30. Network hardware component 30, which may be a router, switch, bridge, modem, system controller, et cetera, may provide a wide area network (WAN) coupling 42 for communication system 10. Furthermore, wireless communication devices 20-28 may be of a variety of devices, including laptop computers 21, 25; personal digital assistants (PDA) 20, 27; personal computers (PC) 23, 24, 28; and/or cellular telephones (cell phone) 22, 26. The details of the wireless communication devices shown are described in greater detail with reference to FIG. 2.

Wireless communication devices 22, 23, and 24 are shown located within an independent basic service set (IBSS) area 13 and these devices communicate directly (i.e., point to point). In this example configuration, these devices 22, 23, and 24 typically communicate only with each other. To communicate with other wireless communication devices within system 10 or to communicate outside of system 10, devices 22-24 may affiliate with a base station or access point, such as BS/AP 17, or one of the other BS/AP units 15, 16.

BS/AP 15, 16 are typically located within respective basic service set (BSS) areas 11, 12 and are directly or indirectly coupled to network hardware component 30 via local area network (LAN) couplings 32, 33. Such couplings provide BS/AP 15, 16 with connectivity to other devices within system 10 and provide connectivity to other networks via WAN connection 42. To communicate with the wireless communication devices within its respective BSS 11, 12, each of the BS/AP 15, 16 has an associated antenna or antenna array. For instance, BS/AP 15 wirelessly communicates with wireless communication devices 20, 21, while BS/AP 16 wirelessly communicates with wireless communication devices 25-28. Typically, the wireless communication devices register with a particular BS/AP 15, 16 to receive services within communication system 10. As illustrated, when BS/AP 17 is utilized with IBSS area 13, LAN coupling 17 may couple BS/AP 17 to network hardware component 30.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
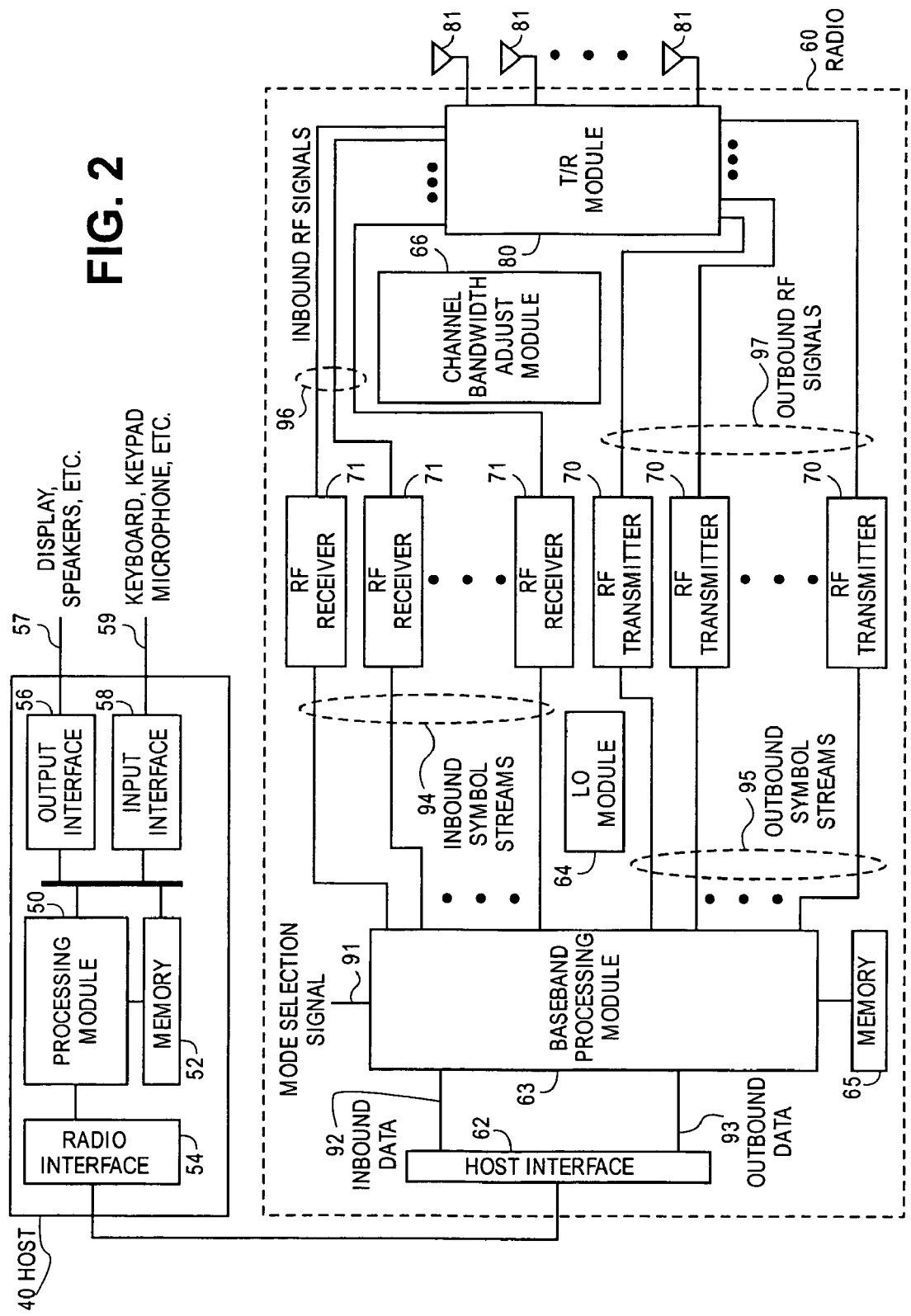
FIG. 2 is a block schematic diagram illustrating a wireless communication device in accordance with one embodiment of the present invention.

FIG. 2 is a schematic block diagram illustrating a wireless communication device that includes a host 40 and an associated radio 60. Host 40 may be one of the devices 20-28 shown in FIG. 1. For cellular telephone hosts, radio 60 is typically a built-in component. For personal digital assistant hosts, laptop hosts, and/or personal computer hosts, radio 60 may be built-in or an externally coupled component.

As illustrated, host 40 includes a processing module 50, memory 52, radio interface 54, input interface 58 and output interface 56. Processing module 50 and memory 52 execute corresponding instructions that are typically done by the host device. For example, for a cellular telephone host device, processing module 50 may perform the corresponding communication functions in accordance with a particular cellular telephone standard.

Generally, radio interface 54 allows data to be received from and sent to radio 60. For data received from radio 60 (such as inbound data 92), radio interface 54 provides the data to processing module 50 for further processing and/or routing to output interface 56. Output interface 56 provides connectivity on line 57 to an output device, such as a display, monitor, speakers, et cetera, in order to output the received data. Radio interface 54 also provides data from processing module 50 to radio 60. Processing module 50 may receive outbound data on line 59 from an input device, such as a keyboard, keypad, microphone, et cetera, via input interface 58 or generate the data itself. For data received via input interface 58, processing module 50 may perform a corresponding host function on the data and/or route it to radio 60 via radio interface 54.

Radio 60 includes a host interface 62, a baseband processing module 63, memory 65, one or more radio frequency (RF) transmitter units 70, a transmit/receive (T/R) module 80, one or more antennas 81, one or more RF receivers 71, a channel bandwidth adjust module 66, and a local oscillation module 64. Baseband processing module 63, in combination with operational instructions stored in memory 65, executes digital receiver functions and digital transmitter functions. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

Baseband processing module 63 may be implemented using one or more processing devices. Such processing device(s) may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 65 may be a single memory device or a plurality of memory devices. Such a memory device may be a read-only memory, random access memory, volatile memory, non-volatile memory, static memory, dynamic memory, flash memory, and/or any device that stores digital information. Note that when processing module 63 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 60 receives outbound data 93 from host 40 via host interface 62. Baseband processing module 63 receives outbound data 93 and based on a mode selection signal 91, produces one or more outbound symbol streams 95. Mode selection signal 91 typically indicates a particular mode of operation that is compliant with one or more specific modes of the various IEEE 802.11 standards. For example, in one embodiment mode selection signal 91 may indicate a frequency band of 2.4 GHz, a channel bandwidth of 20 or 22 MHz and a maximum bit rate of 54 megabits-per-second. In this general category, mode selection signal 91 may further indicate a particular rate ranging from 1 megabit-per-second to 54 megabits-per-second, or higher.

In addition, mode selection signal 91 may indicate a particular type of modulation, which includes, but is not limited to, Barker Code Modulation, BPSK, QPSK, CCK, 16 QAM and/or 64 QAM, as well as others. Mode selection signal 91 may also include a code rate, a number of coded bits per subcarrier (NBPSC), coded bits per OFDM symbol (NCBPS), and/or data bits per OFDM symbol (NDBPS). Mode selection signal 91 may also indicate a particular channelization for the corresponding mode that provides a channel number and corresponding center frequency. Mode select signal 91 may further indicate a power spectral density mask value and a number of antennas to be initially used for a MIMO communication.

Baseband processing module 63, based on mode selection signal 91, produces one or more outbound symbol streams 95 from outbound data 93. For example, if mode selection signal 91 indicates that a single transmit antenna is being utilized for the particular mode that has been selected, baseband processing module 63 produces a single outbound symbol stream 95. Alternatively, if mode selection signal 91 indicates 2, 3 or 4 antennas, baseband processing module 63 produces respective 2, 3 or 4 outbound symbol streams 95 from outbound data 93.

Depending on the number of outbound symbol streams 95 (e.g. 1 to n) produced by baseband processing module 63, a corresponding number of RF transmitters 70 are enabled to convert outbound symbol stream(s) 95 into outbound RF signals 97. Generally, each RF transmitter 70 includes a digital filter and up sampling module, a digital to analog conversion module, an analog filter module, a frequency up conversion module, a power amplifier, and a radio frequency bandpass filter. RF transmitters 70 provide outbound RF signals 97 to T/R module 80, which provides each outbound RF signal 97 to a corresponding antenna 81.

When radio 60 is in the receive mode, T/R module 80 receives one or more inbound RF signals 96 via antenna(s) 81 and provides signal(s) 96 to respective one or more RF receivers 71. RF receiver(s) 71, based on settings provided by channel bandwidth adjust module 87, converts inbound RF signals 96 into a corresponding number of inbound symbol streams 94. The number of inbound symbol streams 94 corresponds to the particular mode in which the data was received. Baseband processing module 63 converts inbound symbol streams 94 into inbound data 92, which is provided to host 40 via host interface 62.

The wireless communication device of FIG. 2 may be implemented using one or more integrated circuits. For example, host 40 may be implemented on one integrated circuit, baseband processing module 63 and memory 65 may be implemented on a second integrated circuit, and the remaining components of radio 60 (less the antennas 81) may be implemented on a third integrated circuit. As an alternative embodiment, baseband processing module 63 and radio 60 may be implemented on a single integrated circuit. In another embodiment, processing module 50 of host 40 and baseband processing module 63 may be a common processing device implemented on a single integrated circuit. Furthermore, memory 52 and memory 65 may be implemented on the same memory device and/or on the same integrated circuit as the common processing modules of processing module 50 and baseband processing module 63. It is to be noted that other embodiments may be implemented with the various units of FIG. 2.

The various embodiments of the wireless communication device of FIG. 2 may be implemented in a transmitter and/or a receiver utilized for wireless communications. Typically, the communication is both ways so that the two units employ a transceiver in order to send and receive data. The multiple RF transmitters 70 and RF receivers 71 allow the device of FIG. 2 to be utilized in a multiple antenna transceiver system.

Figure 3:
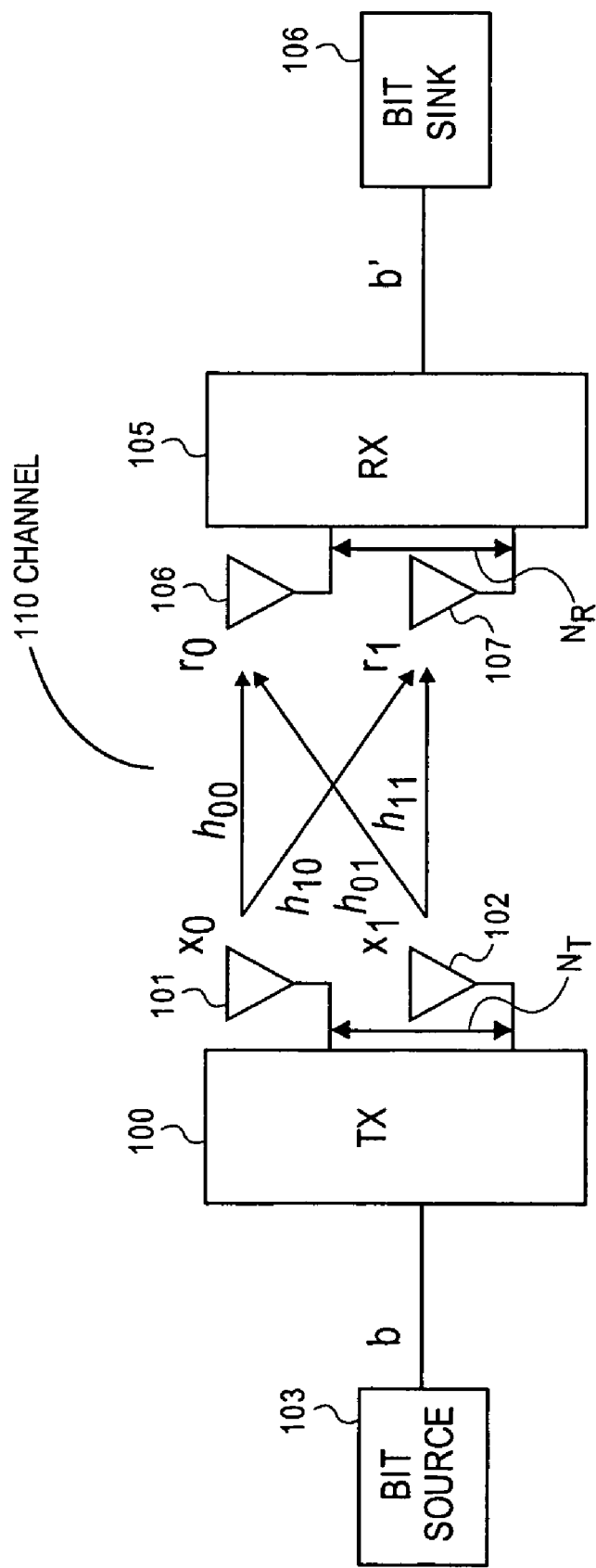
FIG. 3 is a diagram of a MIMO communication system having two antennas at a transmitter and two antennas at a receiver.

FIG. 3 shows one particular example when communication is achieved using two antennas at the transmitter and two antennas at the receiver.

In FIG. 3 a transmitting (TX) unit 100 is shown having two antennas 101, 102, while a receiving (RX) unit 105 is shown having two antennas 106, 107. It is to be noted that both transmitting unit 100 and receiving unit 105 are generally both transceivers, but are shown as separate TX and RX units for exemplary purpose in FIG. 3. That is, TX unit 100 is transmitting data and RX unit 105 is receiving the transmitted data. In the example diagram of FIG. 3, a bit source 103 generates data bit or bits b for transmission. TX unit 100 converts bits b to a signal suitable for transmission over a channel 110 by generating $N_T$ signals for simultaneous transmission from the multiple transmitting antennas present. Since there are two transmitting antennas present, $N_T$ is equal to two in this example, and $x_0$ and $x_1$ denote the components of the $N_T$ dimensional vector transmit signal from antennas 101, 102.

Channel 110 models the propagation of signals $x_0$ and $x_1$ from TX antennas 101 and 102 to RX antennas 106 and 107. The signal at the $N_R$ receive antennas may be represented by an $N_R$ dimensional vector r' representing the channel output. Since there are two receiver antennas 106, 107 present for the example of FIG. 3, the signal at the receiver antennas r' is comprised of two components, $r'_0$ and $r'_1$. Noise n with components $n_0$ and $n_1$ adds to r' to produce RX input r, with components $r_0$ and $r_1$. RX unit 105 converts the $r_0$ and $r_1$ signals to generate b', which is an estimate of the transmitted bits b. Bits b' are then coupled to bit sink 106 for further processing. With proper reception and conversion, b' corresponds to the transmitted bits b. With respect to FIG. 2, in one embodiment bit source 103 and bit sink 106 correspond to host 40 in transceivers, while TX unit 100 and RX unit 10S correspond to radio 60. TX unit 100 would include two RF transmitters 70 and RX unit 105 would include two RF receivers 71.

Generally, a communication system may be modeled by the equation:

$$r = Hx + n$$

where H denotes channel 110. H may be represented as a matrix of size $N_R$ by $N_T$, with elements $h_{ij}$. For the two-transmit-antenna/two-receive-antenna (2×2) MIMO system of FIG. 3, the four resulting RF signal paths of the channel H may be noted as $h_{00}$, $h_{01}$, $h_{10}$ and $h_{11}$, which represent the elements of the $N_R \times N_T$ matrix ($N_T = N_R = 2$ in a 2×2 system). It is appreciated that other MIMO systems of different $N_R \times N_T$ may be readily implemented where other than 2×2 antenna systems are employed. The model noted above may be readily adapted for arbitrary $N_T$ and $N_R$ systems.

For the 2×2 MIMO system of FIG. 3, the above equation may be represented in matrix form with vector components $x_0, x_1, r_0, r_1, n_0$ and $n_1$ as:

$$\begin{bmatrix} r_0 \\ r_1 \end{bmatrix} = \begin{bmatrix} h_{00} & h_{01} \\ h_{10} & h_{11} \end{bmatrix} \begin{bmatrix} x_0 \\ x_1 \end{bmatrix} + \begin{bmatrix} n_0 \\ n_1 \end{bmatrix}$$

and by $$\begin{bmatrix} r'_0 \\ r'_1 \end{bmatrix} = \begin{bmatrix} h_{00} & h_{01} \\ h_{10} & h_{11} \end{bmatrix} \begin{bmatrix} x_0 \\ x_1 \end{bmatrix}$$

when neglecting noise.

where $x_0$ and $x_1$ represent signals transmitted from respective transmitting antennas and $r_0$ and $r_1$ represent signals at the input of a receiver.

A variety of techniques may be employed to detect the incoming signal r and estimate the value of bits b'. One technique for estimation using maximum likelihood is outlined below with the following equation.

$$\hat{\theta} = \arg\max_{\theta} P(Y_1, \ldots, Y_N \mid \theta)$$

In this particular technique, the value of a parameter $\theta$ is estimated based on observations $Y_1, Y_2, \ldots Y_N$, which are functions of $\theta$. The estimated value is the value of $\theta$ which maximizes $P(Y_1, \ldots, Y_N \mid \theta)$. The function $P(Y_1, \ldots, Y_N \mid \theta)$ is the conditional probability of observing $Y_1, \ldots Y_N$ given a particular value of $\theta$.

The embodiment of the model noted above may be applied to a communication system, such that observation r is used to compute information about bit $b_k$, so that:

$$P(r \mid b_k = b) = \sum_{x : b_k = b} P(r \mid x)$$

where $P(r|x)$ is the probability of receiver input r, given transmit symbol x, and the summation is taken over all transmit symbols x that can be constructed with bit $b_k$ equal to the value b. The index, k, is used to refer to a particular bit, $b_k$, within the grouping of bits used to construct x. This is used to estimate $b_k$ and this estimate is used for further processing in the RX unit 105.

Since each bit $b_k$ may take on a value of 0 or 1, $P(r|b_k)$ is calculated for $b_k = 0$ and $b_k = 1$. A likelihood that a particular $b_k$ equals 1 or equals 0 may be expressed in a ratio defined as a likelihood ratio (LR). In one embodiment, a logarithm (log) of the likelihood ratio is obtained. A log likelihood ratio (LLR) for $b_k$ may be stated as:

$$L_k = \log \frac{P(r \mid b_k = 1)}{P(r \mid b_k = 0)} = \log \frac{\sum_{x: b_k = 1} P(r \mid x)}{\sum_{x: b_k = 0} P(r \mid x)} \approx \log \frac{\max_{x: b_k = 1} P(r \mid x)}{\max_{x: b_k = 0} P(r \mid x)}$$

where $L_k$ denotes the logarithm of the ratio of likelihoods of $b_k$ being a 1 or 0. The log likelihood ratio allows a subtraction operation to be performed, in which a logarithm of the probability of a particular bit being 0 is subtracted from the logarithm of the probability of the particular bit being a 1. Thus, if $L_k$ is greater than zero, the particular bit is estimated to be more likely a 1 than a 0 and if $L_k$ is less than zero, the particular bit is estimated to be more likely a 0 than a 1. If $L_k$ equals zero, than the probabilities are substantially the same and the observations r indicate that $b_k$ is substantially equally likely to be a 0 or 1. The magnitude of $L_k$ indicates how much more likely a given bit is 1 or 0. Thus, $L_k$ can be used to estimate the value of $b_k$ or can be used as probabilistic or "soft" maximum likelihood information about $b_k$ that may be processed further by a receiver. As will be noted below, this technique, for determining the maximum likelihood of a particular bit being received is a transmitted 1 or 0, is utilized in a detection portion of MIMO receivers.

It is appreciated that the more advanced communication protocols may utilize techniques that transmit many bits simultaneously and may employ multiple subcarriers (or tones) when transmitting data in order to increase the transmitted data rate. For example, orthogonal frequency division multiplexing (OFDM) utilizes multiple tones in which each of the tones corresponds to data transmission. The transmitted bits may be represented by a mapping into a I/Q (in-phase/quadrature) constellation. One example is a $M^2$-QAM (Quadrature Amplitude Modulation) signal in which m bits map into $M^2$ points (where $2^m=M^2$ points). Thus, when m=4 (four bits are sent), the constellation contains sixteen points (16-QAM). With six bits, the constellation contains sixty-four points (64-QAM). When the number of constellation points increases, more steps are utilized to obtain the $L_k$ computation. When data is sent over a channel utilizing multiple antennas, the complexity is magnified due to the multiple paths available in the channel. It is to be noted that OFDM and QAM are independent techniques and one may be used without the other. However, the two techniques may be used in combination in various systems and standards. Furthermore, the invention is not limited to OFDM and/or QAM and embodiments of the invention may be adapted to other systems and techniques.

As an example, in a 2×2 MIMO system (such as that of FIG. 3) using $M^2$-QAM, the superscript 2 refers to the two dimensions (in-phase and quadrature), with M signal levels in each of these two dimensions. Any of the M levels in the in phase dimension may be used in combination with any of the M levels in the quadrature dimension, resulting in $M^2$ possible combinations.

The r=Hx+n equation may be represented as:

$$\begin{bmatrix} r_0 \\ r_1 \end{bmatrix} = \begin{bmatrix} h_{00} & h_{01} \\ h_{10} & h_{11} \end{bmatrix} \begin{bmatrix} x_{0,I} + jx_{0,Q} \\ x_{1,I} + jx_{1,Q} \end{bmatrix} + \begin{bmatrix} n_0 \\ n_1 \end{bmatrix}$$

where $x_{s,I}$ is the in-phase (I) component and $X_{s,Q}$ is the quadrature (Q) component of $x_s$, for s=0, 1; H is the channel matrix; $n_0$ and $n_1$ are independent complex Gaussian random variables with mean zero and variance $\sigma_0^2$ and $\sigma_1^2$, respectively; and r is the received signal.

Then, the LLR to determine $L_k$ may be represented as:

$$L_k = \log \frac{\max_{x|b_k=1} P(r|x)}{\max_{x|b_k=0} P(r|x)}$$

$$= \left( \min_{x|b_k=0} - \min_{x|b_k=1} \right) \left( \frac{|r_0 - h_{00}x_0 - h_{01}x_1|^2}{\sigma_0^2} + \frac{|r_1 - h_{10}x_0 - h_{11}x_1|^2}{\sigma_1^2} \right)$$

where $$\left( \min_{x|b_k=0} - \min_{x|b_k=1} \right)(g(x))$$

is compact notation for $$\min_{x|b_k=0}(g(x)) - \min_{x|b_k=1}(g(x))$$

for any function g(x). The second expression for $L_k$ follows from a model based on $n_0$ and $n_1$ being Gaussian. Note that in determining the $L_k$ value, the second line of the above equation now looks at the two minimums (instead of the maximums).

Figure 4:
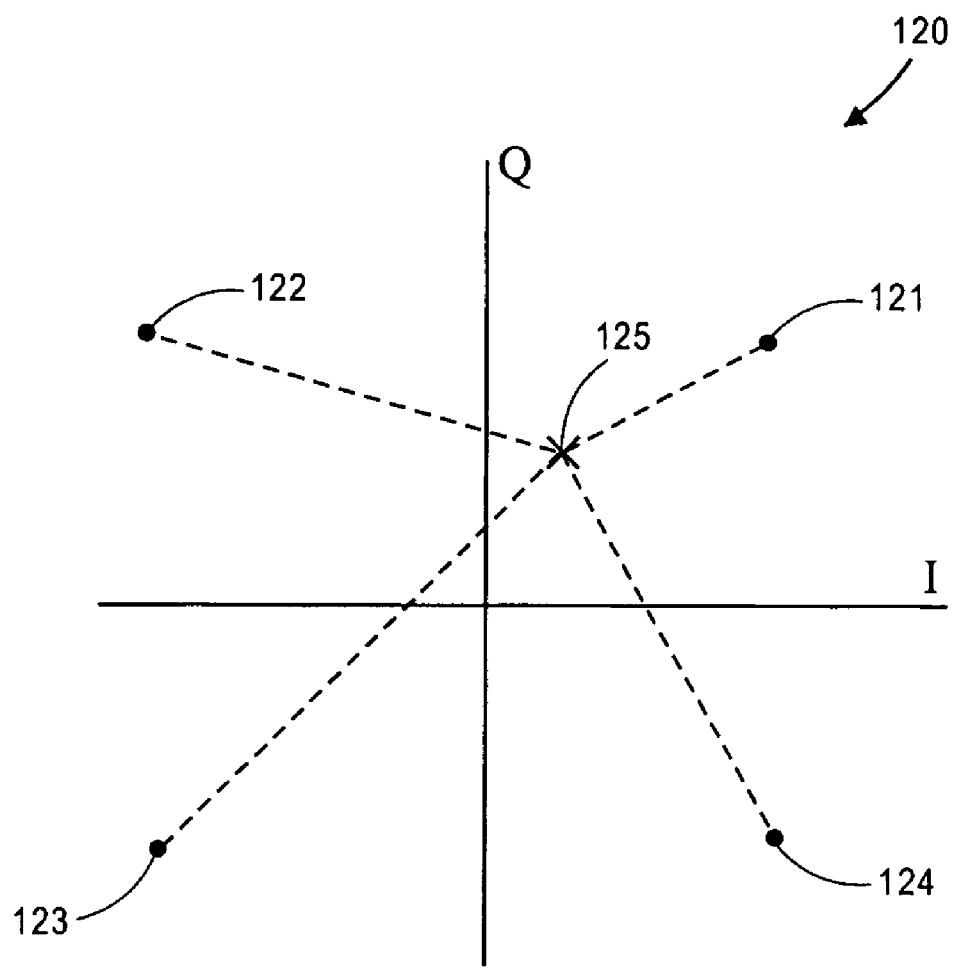
FIG. 4 is a diagram of a constellation in which a most likely data point on the constellation for a signal point is determined by a minimum squared Euclidean distance to the data points.

As a simple example, FIG. 4 illustrates a SISO situation where a particular received signal r falls at location point 125 in a I/Q plane 120. Assuming a 4-QAM mapping, the noise-less channel output r' has four candidate constellation data points 121, 122, 123, 124. Computations are performed to detect the most likely candidate point for received signal point 125. Since the minimum distance, computed using squared Euclidean distance measurement, is to candidate point 121, it is most likely that received signal point 125 is a result of a transmission corresponding to data point 121. Since distance computations are made from each candidate point on the constellation to the received point, the number of requisite computations is based on the number of candidate points present.

Figure 5:
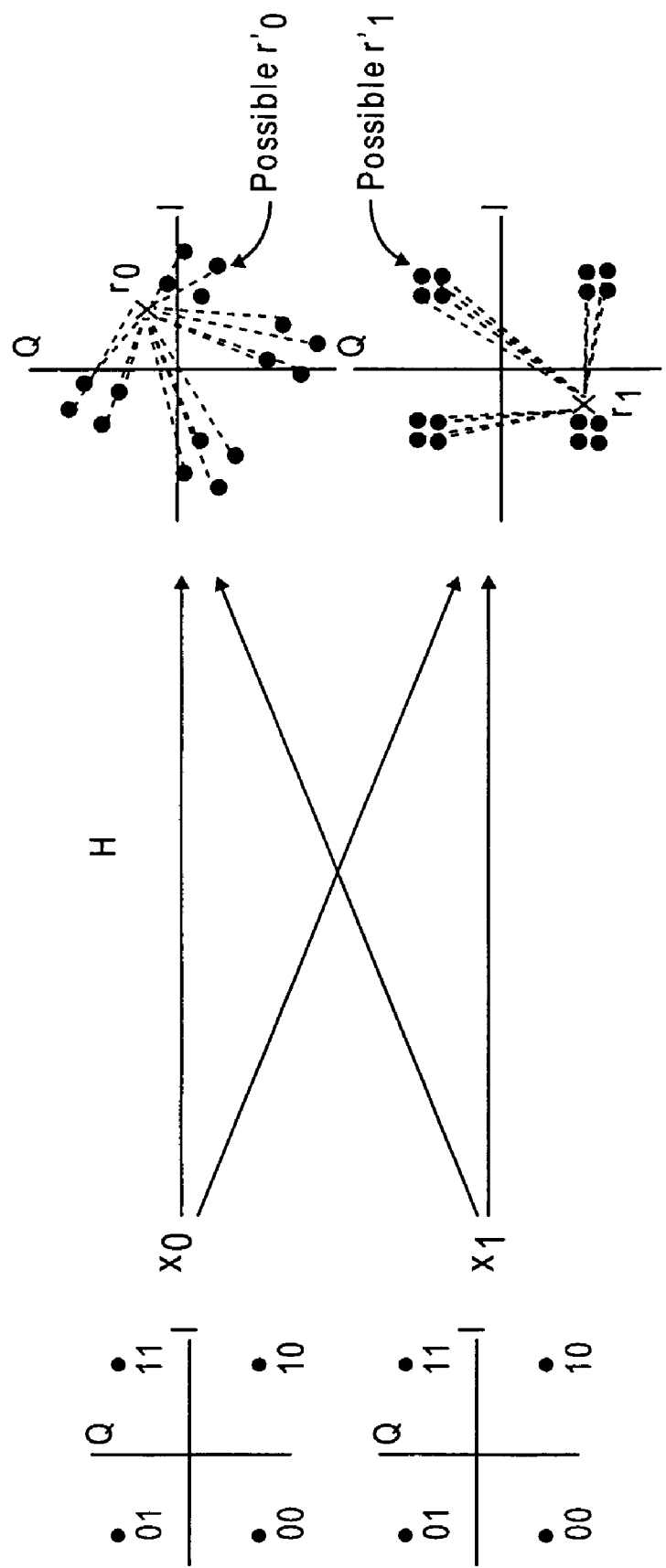
FIG. 5 is a diagram of a 2×2 MIMO system showing the transmit constellations, channel, received signals, and all possible hypothetical noiseless receive signals.

In a MIMO system, each one of the $N_T$ transmission signals is chosen from a constellation and there are $N_R$ received points. Distance computations are made from the $N_R$ dimensional received point to hypothetical noiseless receive points corresponding to each possible combination of $N_T$ constellation points. For example, in a 2×2 MIMO system shown in FIG. 5, $x_0$ and $x_1$ would each be drawn from a constellation and multi-dimensional distance comparisons are made to determine the most likely data point for each bit transmitted. In the example embodiment of FIG. 5, four bits are transmitted, resulting in sixteen possible $r'_0$ for received signal $r_0$ and sixteen $r'_1$ for received signal $r_1$. Thus, when computing for P(r|x) for each possible $(x_0,x_1)$ pair, a considerable number of computations are required and hardware implementation may be difficult to achieve. However, a maximum likelihood (ML) detection technique may nevertheless be implemented for MIMO systems.

Using the 2×2 MIMO system as an example embodiment, detection involves going over all possible vectors (or candidates), which contain all hypothetical representations for the two transmit signals $x_0$ and $x_1$, and reconstructing hypothetical, noiseless receive signal vectors, given reception of a particular $x_0$ and $x_1$ pair through channel H. A computation is made of the squared Euclidean distance between those hypothetical received signals and the actual received signal vectors. Each transmit signal ($x_0$ and $x_1$) has a corresponding binary representation, where the number of bits per dimension is related to the modulation scheme being utilized. Then, from an overall list of distance measures, for each bit $b_k$, the one minimum distance value under the constraint of this bit being 0 ($b_k=0$) and the other one minimum distance value for this bit being 1 ($b_k=1$) are found. Once those two minimum distance values per bit are determined, a "soft-reliability value", in the form of a log-likelihood ratio, is obtained for each bit k by subtracting one of the minimum distances from the other at the end of the constellation search.

Where there are a large number of candidates, a substantial number of computations are generally required, where such number of computations may be prohibitive when implemented in hardware. However, a detection technique described below reduces the number of total computations required and allows for practical implementation in hardware.

Figure 6:
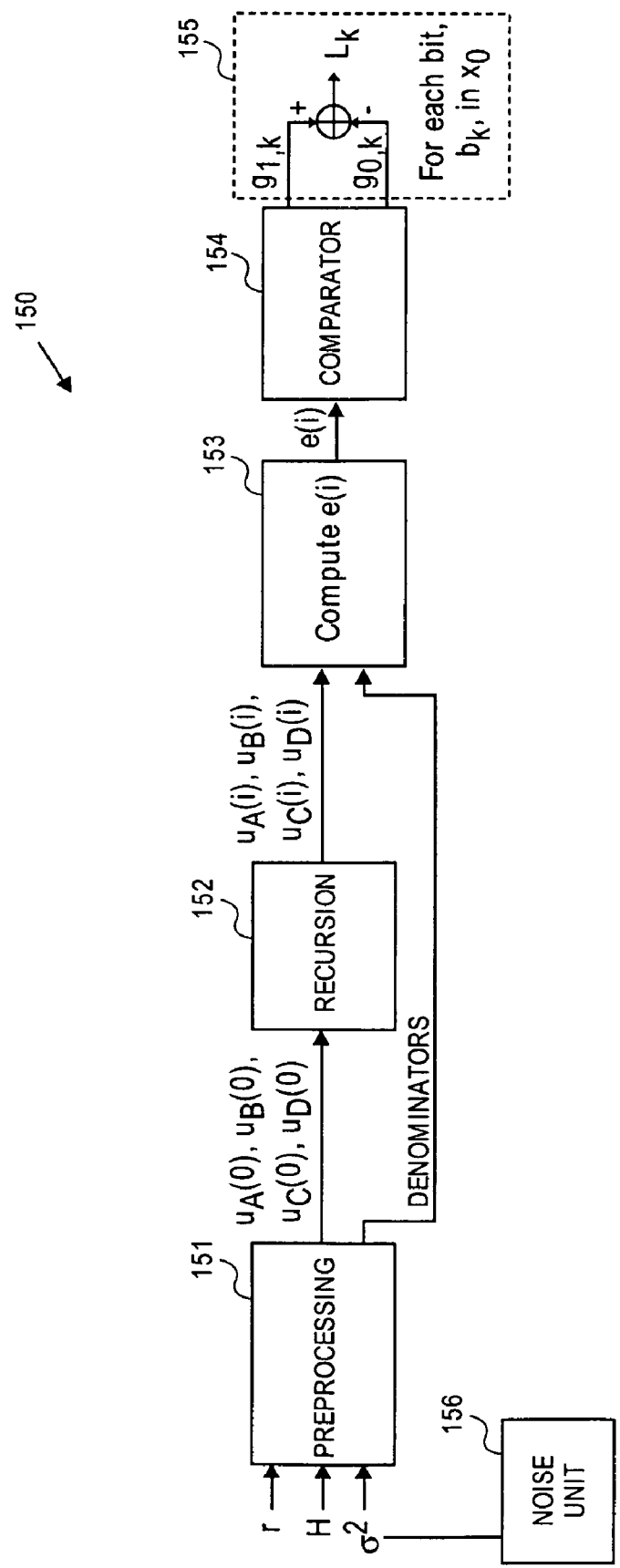
FIG. 6 is a block schematic diagram of an apparatus to perform the various computations to solve for $L_k$ to perform maximum likelihood detection on a received signal in a MIMO receiver.
Figure 7:
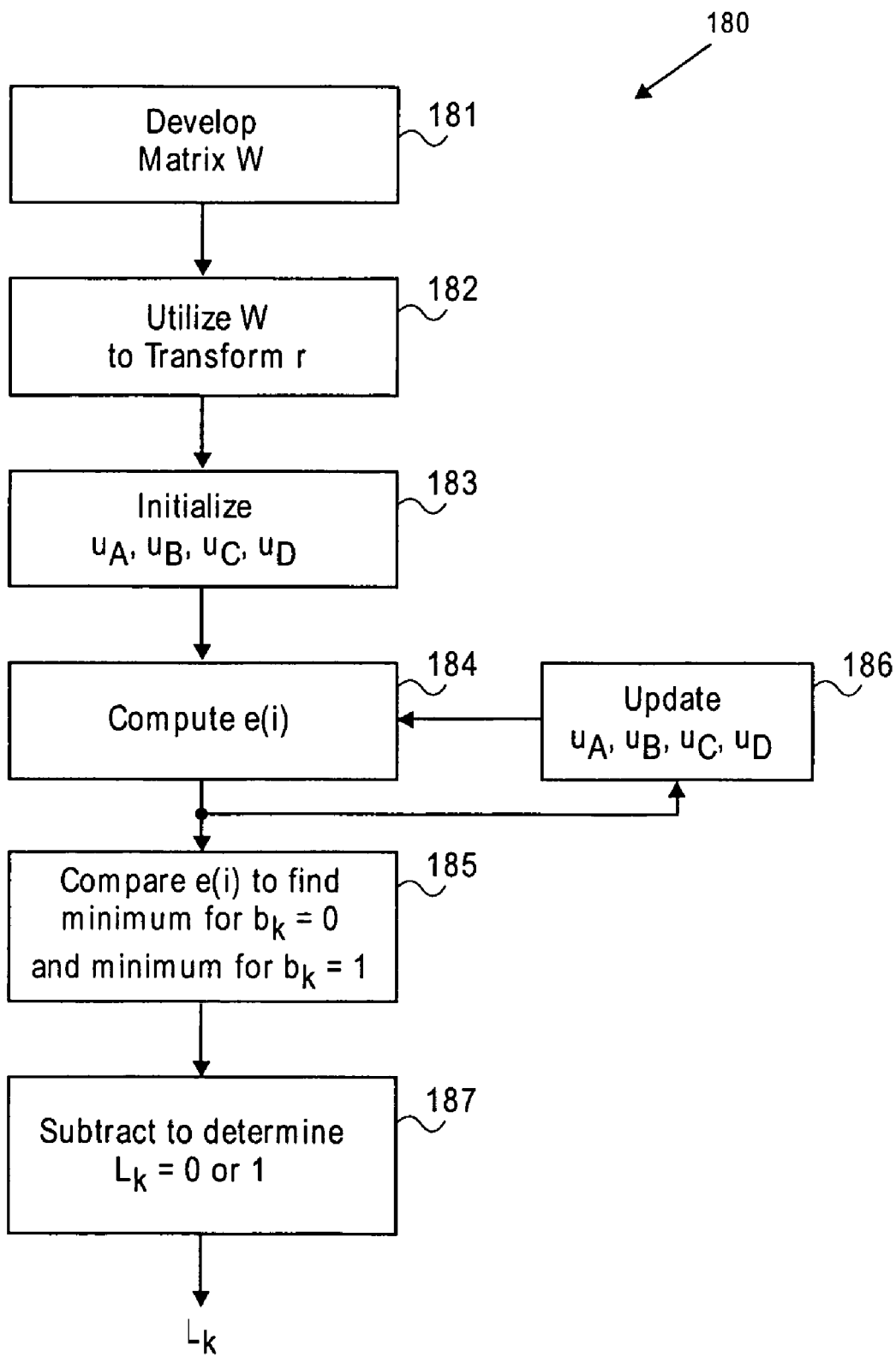
FIG. 7 is a flow diagram of a method to perform the various computations to solve for $L_k$ to perform maximum likelihood detection on a received signal in a MIMO receiver.

A block diagram of an embodiment of the invention is shown in an apparatus 150 of FIG. 6 and a method 180 for practicing an embodiment of the invention is shown in FIG. 7. Thus, viewing FIGS. 6 and 7 while reading the description aids in understanding the embodiments of the invention described below.

In the 2×2 MIMO system of FIG. 3, one example technique for obtaining ML detection with reduced computation for bits corresponding to $x_0$ and $x_1$ is shown below. In determining $L_k$ for the bits that comprise $x_0$, a linear transformation utilizing a weighting matrix W is first made to channel H to obtain a particular transformed matrix WH. For $x_0$, a weighting matrix $W^{(0)}$ is selected such that $$W^{(0)}H = \begin{bmatrix} a & 0 \\ b & c \end{bmatrix} \text{ and } W^{(0)} \begin{bmatrix} \sigma_0^2 & 0 \\ 0 & \sigma_1^2 \end{bmatrix} (W^{(0)})^H = \begin{bmatrix} K_0 & 0 \\ 0 & K_1 \end{bmatrix}$$

where a, b and c are variables of a transformed 2×2 triangular matrix having a value of zero in the second term (upper row, right column) of the matrix and $$W^{(0)} \begin{bmatrix} \sigma_0^2 & 0 \\ 0 & \sigma_1^2 \end{bmatrix} (W^{(0)})^H$$

is a diagonal matrix. In the above, $(A)^H$ denotes the Hermitian transpose of A, which is the complex conjugate of the transpose of A (where A is an arbitrary variable representing a matrix). That is, a W matrix is found, so that when W operates on H, the result is a "a-0-b-c" matrix WH. Matrix $W^{(0)}$ may be found by using known linear algebra techniques such as QR factorization of H. Thus, a linear transformation is used to convert the MIMO channel into a triangular form.

Matrix $W^{(0)}$ is then applied to r, so that $$y = \begin{bmatrix} y_0 \\ y_1 \end{bmatrix} = W^{(0)} r$$

where y is the received signal vector r transformed by the weighting matrix $W^{(0)}$.

Then, for a bit, $b_k$, that is a component of $x_0$:

$$L_k = \left( \min_{(x_0, x_1)|b_k=0} - \min_{(x_0, x_1)|b_k=1} \right) \left( \frac{|r_0 - h_{00}x_0 - h_{01}x_1|^2}{\sigma_0^2} + \frac{|r_1 - h_{10}x_0 - h_{11}x_1|^2}{\sigma_1^2} \right)$$

$$= \left( \min_{(x_0, x_1)|b_k=0} - \min_{(x_0, x_1)|b_k=1} \right) \left( \frac{|y_0 - ax_0|^2}{K_0} + \frac{|y_1 - bx_0 - cx_1|^2}{K_1} \right)$$

Note that by applying the transformation $W^{(0)}$, the first partitioned term in the addition is made independent of $x_1$. Therefore, the expression for $L_k$ may be written as:

$$L_k = \left( \min_{x_0|b_k=0} - \min_{x_0|b_k=1} \right) \left( \frac{|y_0 - ax_0|^2}{K_0} + \min_{x_1} \frac{|y_1 - bx_0 - cx_1|^2}{K_1} \right).$$

This transformation allows a Euclidean distance metric to be written in partitioned form, where one partitioned term (first addend) depends only on $x_0$, whereas the second partitioned term (second addend) depends on both $x_0$ and $x_1$, and in which both partitioned terms are in quadratic form.

For a given value $x_0$, one way to determine the minimum of the second addend over all $x_1$ is to compute its value for each point in the constellation from which $x_1$ is drawn. However, the search over all $x_1$ may be reduced to a simpler computation. The $x_1$ which, when scaled by c, is closest, in terms of squared Euclidean distance, to $y_1 - bx_0$ may be found by quantizing $y_1 - bx_0$ to the nearest possible $cx_1$. That is, because the first partitioned term is independent of $x_1$ and the second partitioned term has regular quadratic form, for a fixed $x_0$, a standard QAM slicer may be used to implicitly search over all values of $x_1$. This quantization, or "slicing" operation, may be computed directly, given $(y_1 - bx_0)$ and c, and it does not require a search over and computation of the second addend for all possible $x_1$. Once the best $x_1$ is found, $L_k$ may be expressed as:

$$L_k = \left( \min_{x_0|b_k=0} - \min_{x_0|b_k=1} \right) \left( \frac{|y_0 - ax_0|^2}{K_0} + \frac{|y_1 - bx_0 - cS_M^c(y_1 - bx_0)|^2}{K_1} \right)$$

where $S^c_M(y_1 - bx_0)$ is a slicer for $M^2$-QAM scaled to a constellation of $\pm c, \pm 3c, \ldots \pm(M-1)c$ in each dimension. The function of this particular slicer is to find, out of all possible $x_1$'s, the particular $x_1$ that, when multiplied by c, is nearest to $y_1 - bx_0$ using a squared Euclidean distance metric.

It is to be noted that without the transformation by the W matrix and "slicing" operation, the receiver explicitly searches over all $(x_0, x_1)$ pairs to compute the maximum likelihood estimates. For a 64-QAM constellation, that results in $64^2$ (4096) candidate points. However, by employing a matrix W that results in a triangular WH, the explicit search over $x_1$ for each $x_0$ is removed due to the "0" value in the triangular matrix in combination with the use of the slicer. The combination of the linear transformation and using the slicer reduces the number of candidate Euclidean distances from the number of possible $(x_0, x_1)$ combinations to the number of possible $x_0$'s. For a 64-QAM constellation, the search is reduced to 64 candidate points.

It is to be noted that in selecting W, where $$WH = \begin{bmatrix} a & 0 \\ b & c \end{bmatrix} \text{ and } W^{(0)} \begin{bmatrix} \sigma_0^2 & 0 \\ 0 & \sigma_1^2 \end{bmatrix} (W^{(0)})^H = \begin{bmatrix} K_0 & 0 \\ 0 & K_1 \end{bmatrix}$$

a number of choices exist for the selection of W. In one particular embodiment, W is chosen as follows. If H is defined as $$H = \begin{bmatrix} h_{00} & h_{01} \\ h_{10} & h_{11} \end{bmatrix}$$

then W is chosen so that $$W = \begin{bmatrix} h_{11} & -h_{01} \\ h_{01}^* \frac{\sigma_1}{\sigma_0} & h_{11}^* \frac{\sigma_0}{\sigma_1} \end{bmatrix}$$

where * denotes a conjugate. This particular W requires little computation to obtain W from H and may be readily implemented in hardware. As evident, the first term (upper row, left column) of W is obtained from the fourth term (lower row, right column) of H. The second term (upper row, right column) of W is the negative of the second term of H. The third term (lower row, left column) of W is the complex conjugate of the second term of H scaled by $$\frac{\sigma_1}{\sigma_0}.$$

The fourth term of W is the complex conjugate of the fourth term of H scaled by $$\frac{\sigma_0}{\sigma_1}.$$

Thus, with the above selected W, WH computation results in the following triangular matrix:

$$WH = \begin{bmatrix} h_{11}h_{00} - h_{01}h_{10} & 0 \\ h_{01}^* h_{00}\frac{\sigma_1}{\sigma_0} + h_{11}^* h_{10}\frac{\sigma_0}{\sigma_1} & h_{01}^* h_{01}\frac{\sigma_1}{\sigma_0} + h_{11}^* h_{11}\frac{\sigma_0}{\sigma_1} \end{bmatrix}$$

where $h_{01}^* h_{01} = |h_{01}|^2$ and $h_{11}^* h_{11} = |h_{11}|^2$. That is, $$a = h_{11}h_{00} - h_{01}h_{10}$$

$$b = h_{01}^* h_{00}(\sigma_1/\sigma_0) + h_{11}^* h_{10}(\sigma_0/\sigma_1) \text{ and}$$

$$c = |h_{01}|^2(\sigma_1/\sigma_0) + |h_{11}|^2(\sigma_0/\sigma_1)$$

Applying the above W for $x_0$ and using Wij, Hpq designation for the terms of W and H, $L_k$ may be represented as:

$$L_k = \left(\min_{x_0|b_k=0} - \min_{x_0|b_k=1}\right)\left(\frac{|y_0 - ax_0|^2}{K_0} + \frac{|y_1 - bx_0 - cS_M^c(y_1 - bx_0)|^2}{K_1}\right)$$

$$= \left(\min_{x_0|b_k=0} - \min_{x_0|b_k=1}\right)\left(\frac{|y_0 - ax_0|^2}{|H_{11}|^2\sigma_0^2 + |H_{01}|^2\sigma_1^2} + \frac{|y_1 - bx_0 - cS_M^c(y_1 - bx_0)|^2}{|H_{11}|^2\sigma_0^2 + |H_{01}|^2\sigma_1^2}\right)$$

where slicer scaling c and noise variance weightings $|Wij|^2$ may change and be different between different conditions or systems.

In FIG. 7, method 180 illustrates the finding of an appropriate W matrix (box 181) and then utilizing the W matrix to transform r (e.g. to find y for $x_0$) (box 182). In FIG. 6, a preprocessing unit 151 of apparatus 150 computes a desired W and performs the transformation on input r. In some embodiments, a noise computation unit 156 may be present to estimate the noise powers $\sigma_0^2$ and $\sigma_1^2$ to input to preprocessing unit 151 for computation of $L_k$. Also, preprocessing unit 151 may generate the denominator portions of $L_k$ and send the denominators to computation unit 153 for computing the e(i)'s as described below.

To simplify the above $L_k$ equation further, the following variables are defined for the $i^{th}$ candidate search point:

$$u_A(i) = Re(y_1 - bx_0(i))$$

$$u_B(i) = Im(y_1 - bx_0(i))$$

$$u_C(i) = Re(y_0 - ax_0(i))$$

$$u_D(i) = Im(y_0 - ax_0(i))$$

The initial values of $u_A$, $u_B$, $u_C$ and $u_D$ are generated by preprocessing unit 151 and these initialized values (box 183) are used as the initial values in the recursion sequence for updating components of the squared Euclidean distance. The values of $u_A$, $u_B$, $u_C$ and $u_D$ are updated during the search over all candidate points.

Then, for $x_0$:

$$L_k(i) = \left(\min_{x_0|b_k=0} - \min_{x_0|b_k=1}\right)\left(\frac{|u_C(i) + ju_D(i)|^2}{|H_{11}|^2\sigma_0^2 + |H_{01}|^2\sigma_1^2} + \frac{|u_A(i) + ju_B(i) - cS_M^c(u_A(i) + ju_B(i))|^2}{|H_{11}|^2\sigma_0^2 + |H_{01}|^2\sigma_1^2}\right)$$

$$= \left(\min_{x_0|b_k=0} - \min_{x_0|b_k=1}\right)e(i)$$

where $e(i) = \left(\frac{|u_C(i) + ju_D(i)|^2}{|H_{11}|^2\sigma_0^2 + |H_{01}|^2\sigma_1^2} + \frac{|u_A(i) + ju_B(i) - cS_M^c(u_A(i) + ju_B(i))|^2}{|H_{11}|^2\sigma_0^2 + |H_{01}|^2\sigma_1^2}\right)$ It is to be noted that in order to determine $L_k$, P(r|x) is computed for each of $M^2$ points in one of the $M^2$-QAM constellation (e.g. constellation for $x_0$). However, complexity may be reduced if for each $x_0$, parts of P(r|x) for the previous $x_0$ may be reused and need not be computed.

Accordingly, one embodiment utilizes recursive updates of e(i) by stepping through a set pattern of constellation points representing possible values for $x_0$'s in an ordered fashion. A variety of techniques may be used for the recursive steps and one embodiment is shown by Table 1 below and illustrated in a 16-QAM constellation progression pattern for a 16-QAM constellation 200 of FIG. 8. The use of a recursive update uses the coordinates of the last search point for determining the next point. By providing updates to the components of e(i) based on the ordered search, each e(i) need not be re-calculated from the beginning.

Figure 8:
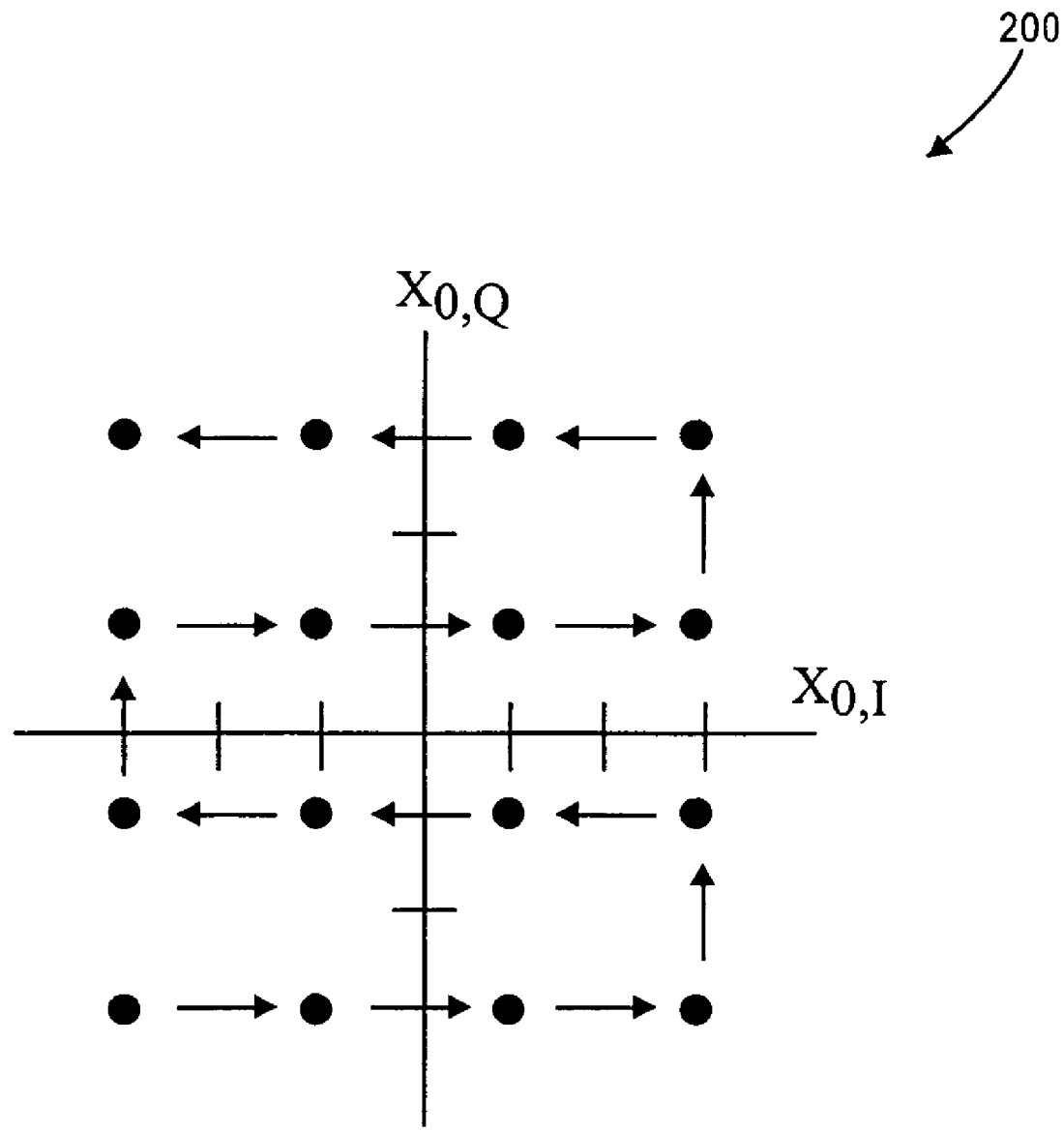
FIG. 8 is a constellation map showing one pattern for updating each constellation point in a recursion sequence to perform the computation to solve for $L_k$.

FIG. 8 shows one pattern that may be utilized to update each point to obtain the next point. In the example embodiment of FIG. 8, the recursive computation starts at a point located in the lower left corner of constellation 200. The update and computation of e(i) at the new point progresses as the candidate point, $x_0$, progresses left to right across the bottom row and then moves up to the next row. The update and computation of e(i) then progresses as $x_0$ progresses right to left, until the end of the row is reached. The update and computation then continues as $x_0$ moves up to the next row and proceeds from left to right. The pattern is repeated until P(r|x) is calculated for all $x_0$.

Table 1 below shows the $x_0$ update steps, where each increment is by 2.

TABLE 1

| Point | $x_{0,I}(i)$ | $x_{0,Q}(i)$ | $x_{0,I}(i+1) - x_{0,I}(i)$ | $x_{0,Q}(i+1) - x_{0,Q}(i)$ | Case |
|---|---|---|---|---|---|
| 0 | 1 − M | 1 − M | 2 | 0 | 2 |
| 1 | 3 − M | 1 − M | 2 | 0 | 2 |
| . | . | . | . | . | . |
| . | . | . | . | . | . |
| . | . | . | . | . | . |
| M − 2 | M − 3 | 1 − M | 2 | 0 | 2 |
| M − 1 | M − 1 | 1 − M | 0 | 2 | 1 |
| M | M − 1 | 3 − M | −2 | 0 | 3 |
| M + 1 | M − 3 | 3 − M | −2 | 0 | 3 |
| . | . | . | . | . | . |
| . | . | . | . | . | . |
| . | . | . | . | . | . |
| 2M − 1 | 1 − M | 3 − M | 0 | 2 | 1 |

TABLE 1-continued

| Point | $x_{0,I}(i)$ | $x_{0,Q}(i)$ | $x_{0,I}(i+1) - x_{0,I}(i)$ | $x_{0,Q}(i+1) - x_{0,Q}(i)$ | Case |
|---|---|---|---|---|---|
| . | . | . | . | . | . |
| . | . | . | . | . | . |
| . | . | . | . | . | . |
| $M^2 - 2$ | $3 - M$ | $M - 1$ | $-2$ | $0$ | 3 |
| $M^2 - 1$ | $1 - M$ | $M - 1$ | don't care | don't care | 1 |

In reference to FIG. 8, moving from point i to i+1 may take one of three movements as noted below:

Moving from point i to i+1:
  $x_{0,Q}$ increases by 2 (Case 1) [moving up];
  $x_{0,I}$ increases by 2 (Case 2) [moving left to right]; or
  $x_{0,I}$ decreases by 2 (Case 3) [moving right to left]

where I is the horizontal in-phase axis and Q is the vertical quadrature axis of the constellation.

This recursion technique is employed in one embodiment of the invention to compute components of $L_k$. As noted in Table 1, some components of e(i) do not change from one $x_0$ to the next, so that only the components that change need be computed. Components that do change do so in deterministic fashion. Thus, using recursive updates to obtain e(i) corresponding to the next point in the constellation is much simpler than computing e(i) from the very beginning value for each $x_0$.

This recursive technique is applied to the equation $$L_k = \left( \min_{x_0 | b_k = 0} - \min_{x_0 | b_k = 1} \right) \left( \frac{|y_0 - ax_0|^2}{|H_{11}|^2 \sigma_0^2 + |H_{01}|^2 \sigma_1^2} + \frac{|y_1 - bx_0 - cS_M^c(y_1 - bx_0)|^2}{|H_{11}|^2 \sigma_0^2 + |H_{01}|^2 \sigma_1^2} \right)$$

In one embodiment, the recursions are set for each of $u_A(i)$, $u_B(i)$, $u_C(i)$, and $u_D(i)$ for updating e(i) for the next search point in the pattern.

$$u_A(i+1) = \begin{cases} u_A(i) + 2b_Q & \text{Case 1} \\ u_A(i) - 2b_I & \text{Case 2} \\ u_A(i) + 2b_I & \text{Case 3} \end{cases}$$

$$u_A(0) = y_{1,I} - (1 - M)(b_I - b_Q)$$

$$u_B(i+1) = \begin{cases} u_B(i) - 2b_I & \text{Case 1} \\ u_B(i) - 2b_Q & \text{Case 2} \\ u_B(i) + 2b_Q & \text{Case 3} \end{cases}$$

$$u_B(0) = y_{1,Q} - (1 - M)(b_I + b_Q)$$

$$u_C(i+1) = \begin{cases} u_C(i) + 2a_Q & \text{Case 1} \\ u_C(i) - 2a_I & \text{Case 2} \\ u_C(i) + 2a_I & \text{Case 3} \end{cases}$$

$$u_C(0) = y_{0,I} - (1 - M)(a_I - a_Q)$$

$$u_D(i+1) = \begin{cases} u_D(i) - 2a_I & \text{Case 1} \\ u_D(i) - 2a_Q & \text{Case 2} \\ u_D(i) + 2a_Q & \text{Case 3} \end{cases}$$

$$u_D(0) = y_{0,Q} - (1 - M)(a_I + a_Q)$$

Applying the recursion technique to $u_A(i)$, $u_B(i)$, $u_C(i)$, and $u_D(i)$ takes advantage by updating just used values of $u_A(i)$, $u_B(i)$, $u_C(i)$, and $u_D(i)$, which were computed for e(i), to obtain the next values of $u_A(i)$, $u_B(i)$, $u_C(i)$, and $u_D(i)$. Recursion unit 152 of apparatus 150 performs the recursion for updating the values of $u_A(i)$, $u_B(i)$, $u_C(i)$, and $u_D(i)$ (block 186) and computation unit 153 performs the computation for obtaining each e(i) (block 184). It is to be noted that this recursion technique is but just one example to obtain e(i) for the various points of the constellation for $x_0$.

It is to be noted that the minimization over $x_0$ is still performed by looking at each possible candidate of $x_0$ one by one, but this procedure is performed efficiently by computing sub-terms in the overall Euclidean metric term "e". The sub-terms are computed recursively when going from one candidate to the next in a particular ordered fashion.

Once the metric terms are generated in the search over $x_0$ candidates, minimum values are selected under the constraints that $b_k$ is 0 or 1. With the example embodiment, when $$e(i) = \left( \frac{|u_C(i) + ju_D(i)|^2}{|H_{11}|^2 \sigma_0^2 + |H_{01}|^2 \sigma_1^2} + \frac{|u_A(i) + ju_B(i) - cS_M^c(u_A(i) + ju_B(i))|^2}{|H_{11}|^2 \sigma_0^2 + |H_{01}|^2 \sigma_1^2} \right)$$

values have been computed as local minimums, a technique is employed to compute a global minimum Euclidean distance over all $x_0$ for the particular bit being 0 or the bit being 1. That is, compute $$\left( \min_{x_0 | b_k = 0} \right)$$

and $$\left( \min_{x_0 | b_k = 0} \right)$$

values in order to solve for $$\left( \min_{x_0 | b_k = 0} - \min_{x_0 | b_k = 1} \right) e(i)$$

to obtain $L_k$.

In one embodiment, a sorting algorithm or some other minimum distance finding algorithm, may be used to determine the minimum e(i) for all $x_0$ with $b_k = 0$ and minimum e(i) for all $x_0$ with $b_k = 1$. In one technique, all of the e(i) values may be stored, such as in memory, and the values compared for the minimum value. In another embodiment, a comparison technique may be employed to compare each new e(i) value to a previous value to determine which is the smaller. In apparatus 150, comparator unit 154 performs the comparison function (block 185) to find the minimum distance. At the end the remaining global e(i) values are the two minimum values for $b_k = 0$ and $b_k = 1$.

Figure 9:
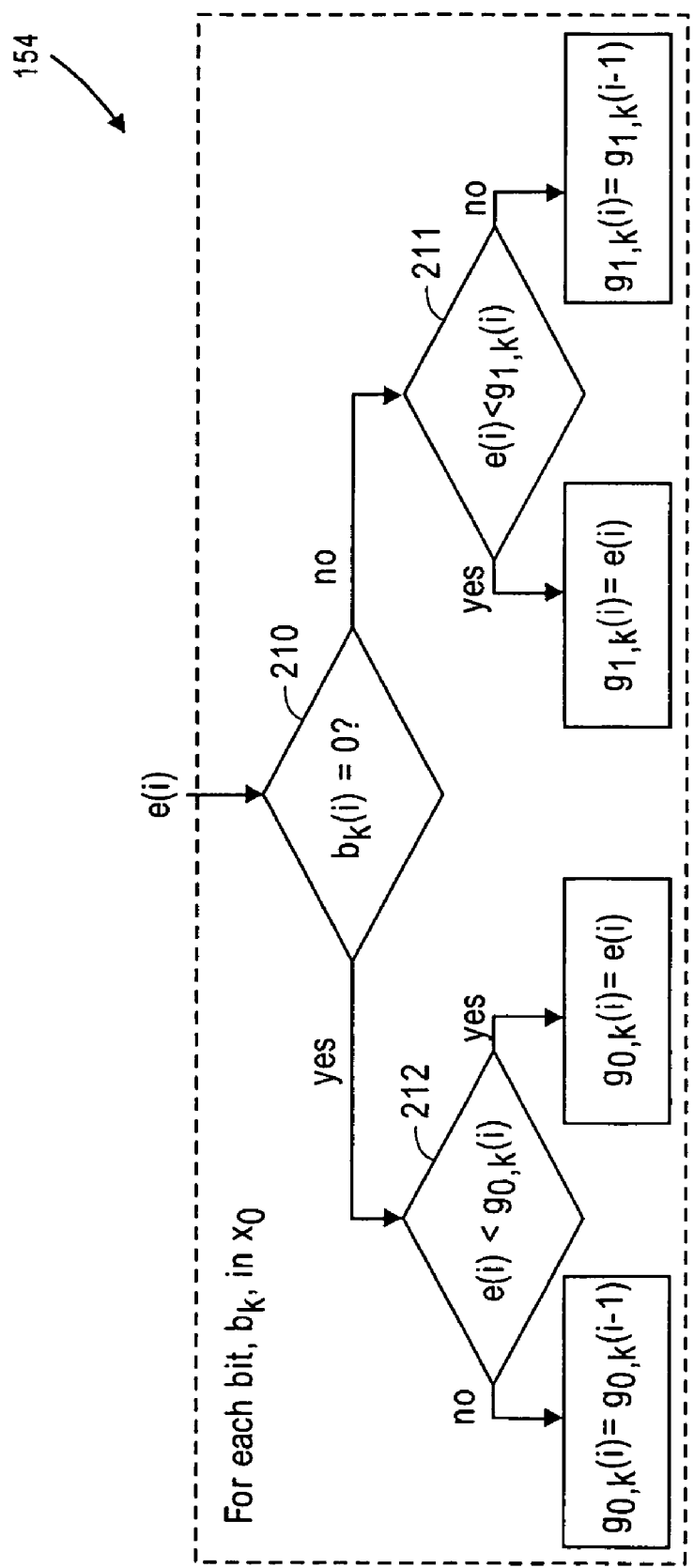
FIG. 9 is an example decision diagram employed in a comparator of the apparatus of FIG. 5 to determine minimum values for bit 0 and bit 1 for each bit in $x_0$.

An example comparator unit is illustrated in FIG. 9 to perform the comparison. In this particular example, the comparator finds the global minimum e(i) for both $b_k = 0$ and $b_k = 1$. That is, $$g_{0,k} = \min_{x|b_k=0} e(i) \text{ and } g_{1,k} = \min_{x|b_k=1} e(i)$$

for each bit, $b_k$, of a corresponding K-bit binary representation of $x_0$. As noted in FIG. 9, the present e(i) value is compared to a previous e(i) value and the smaller value is retained. The $g_{0,k}(i)$ and $g_{1,k}(i)$ denote storage locations for respective global minimums of e(i) up to time i over all $x_0$ with $b_k=0$ and $b_k=1$. Then, the minimum e(i) for $b_k=0$ and $b_k=1$ outputs from comparator 154 are sent to an adder unit 155 as shown in FIG. 6. An adder, such as adder 155, is used to subtract the two minima to generate $L_k$ (block 187 of FIG. 7).

Subsequently or simultaneously in parallel with the computation of $L_k$ for $x_0$, a like procedure is performed to determine $L_k$ for bits of $x_1$. A similar procedure to that used for $x_0$ may be used to solve for the ML values for $x_1$. For $x_1$, a different weighting matrix is selected to form a weighting matrix $W^{(1)}$. For $x_1$, a matrix $W_{(1)}$ is selected such that:

$$W^{(1)}H = \begin{bmatrix} 0 & k \\ 1 & m \end{bmatrix} \text{ and } W^{(1)} \begin{bmatrix} \sigma_0^2 & 0 \\ 0 & \sigma_1^2 \end{bmatrix} (W^{(1)})^H = \begin{bmatrix} K_2 & 0 \\ 0 & K_3 \end{bmatrix}$$

where k, l and m are variables of a 2×2 triangular matrix with the first term (upper row, left column) being zero.

Matrix $W^{(1)}$ is operated on by r, so that $$z = \begin{bmatrix} z_0 \\ z_1 \end{bmatrix} = W^{(1)}r$$

where z is the received signal vector r transformed by the weighting matrix $W^{(1)}$.

Then, for $x_1$:

$$L_k = \left( \min_{x_0|b_k=0} - \min_{x_0|b_k=1} \right) \left( \frac{|z_0 - kx_1|^2}{K_2} + \min_{x_0} \frac{|z_1 - lx_0 - mx_1|^2}{K_3} \right)$$

$$= \left( \min_{x_0|b_k=0} - \min_{x_0|b_k=1} \right) \left( \frac{|z_0 - kx_1|^2}{K_2} + \frac{|z_1 - mx_1 - lS_M^l(z_1 - mx_1)|^2}{K_3} \right)$$

where $S^1M(z_1 - mx_1)$ is a slicer for $M^2$-QAM scaled to a constellation of ±1, ±3l, ... ±(M−1)l in each dimension. The function of this particular slicer is to find, out of all possible $x_0$'s, the particular $x_0$ that, when multiplied by l, is nearest to $z_1 - mx_1$ using a squared Euclidean distance metric. It is to be noted that for $x_1$, the partitioning by the linear transformation is opposite of that of $x_0$. The first partitioned term is a function of $x_1$ only and the second partitioned term is a function of both $x_1$ and $x_0$. The remaining operations for solving for $x_1$ are equivalent to the search performed to find the minimum squared Euclidean distance metric for $x_0$.

It is to be noted that in one embodiment, two separate transformation techniques may be utilized to compute $L_k$ for bits in $x_0$ and $x_1$, as noted above. However, in another embodiment, a similar transformation technique using the same algorithm may be used to compute $L_k$ for both bits in $x_0$ and $x_1$. In this instance, columns of H are swapped in the H matrix for $x_1$ so that the position of the zero value is at the same location for the WH matrix for $x_0$ and for the WH matrix for $x_1$. Thus, if:

$$H = \begin{bmatrix} h_{00} & h_{01} \\ h_{10} & h_{11} \end{bmatrix} \text{ for } x_0, \text{ then } H' = \begin{bmatrix} h_{01} & h_{00} \\ h_{11} & h_{10} \end{bmatrix}$$

so that the two triangular matrices obtained from the computation of $W^{(0)}H$ and $W^{(1)}H'$, results in two matrices having the same triangular matrix format of:

$$\begin{bmatrix} a & 0 \\ b & c \end{bmatrix}$$

with zero in the upper right term of the matrix. This simplicity allows the same algorithm to be used for the computation of $L_k$ for both $x_0$ and $x_1$. Accordingly for the recursion analysis described above for $x_0$, an equivalent technique may be used to solve for $x_1$ with the column swapped H' matrix for $x_1$ to perform the linear transformation/slicer operation.

The embodiments of the invention described above may be implemented in a wireless communication receiver, such as in radio 60 shown in FIG. 2, and implemented in one or more wireless communication devices, such as those shown in FIG. 1. With the invention, the complexity of maximum likelihood detection for a MIMO system is reduced. This reduced complexity MIMO ML may be implemented in hardware, such as in an integrated circuit, and/or lo software, since less circuitry and computations may be required to detect the received signal.

Generally, the embodiments described above achieve maximum likelihood detection for 2×2 MIMO receivers by:

1) going over all possible transmit vectors or "transmit candidates", represented by two transmit signals $x_0$ and $x_1$, and reconstructing hypothetical, noiseless receive signal vectors given a particular ($x_0, x_1$) pair and the channel, H;

2) computing the squared Euclidean distance between those hypothetical, noiseless receive signals and the actual receive signal vectors coming from the antenna;

3) noting that each transmit signal ($x_0$ and $x_1$) has a corresponding binary representation, where the number of bits per dimension is related to the modulation scheme used (e.g., $x0 \Leftrightarrow b_0 \ldots b_5$, $x_1 \Leftrightarrow b_6 \ldots b_{11}$ in 64-QAM);

4) finding from the overall list of distance measures, for each bit $b_k$, the one minimum distance value under the constraint of this bit being 0 ($b_k=0$), and the other one minimum distance value for this bit being 1 ($b_k=1$); and 5) once obtaining those two distance values per bit, the desired quantity may be formed, namely, the "soft-reliability value" (or log-likelihood ratio) $L_k$ for each bit k by subtracting one of the minimum distance measures from the other at the end of the search.

For the particular described embodiments, the embodiments:

1) use a linear transformation to convert the MIMO channel into a triangular form;

2) write the distance metric in a partitioned form, where the first partition only depends on $x_0$, whereas the second partition depends on both $x_0$ and $x_1$; with both partitions in quadratic form;

3) for fixed $x_0$, minimization over $x_1$ may be done by comparing the second partition for all possible values of $x_1$, because the first partition is independent of $x_1$;

4) since the second partition has regular quadratic form, for fixed $x_0$, a standard QAM slicer may be used to implicitly search over all values of $x_0$;

5) the combination of the linear transformation and slicer reduces the number of candidate Euclidean distances from the number of possible $(x_0,x_1)$ combinations to the number of possible $x_0$'s;

6) moreover, the minimization over $x_0$ is done by looking at each possible candidate of $x_0$ one by one by efficiently computing sub-terms in the overall Euclidean metric term "e", wherein the sub-terms are computed recursively when going from one candidate to the next in a particular ordered fashion;

7) from the metric terms generated in this search (one by one over $x_0$ candidates), select the minimum ones under the constraints that bit $b_k$ is 0 or 1 and subtract to get final L value for those bits (all k bits coded into $x_0$);

8) using this ordered search over $x_0$, the amount of computations needed per candidate is reduced; and 9) then the same technique is performed, but using a second partitioning (first partition only function of $x_1$, second partition function of $x_0$ and $x_1$) to get the L values for the bits contained in $x_1$.

Thus, a maximum likelihood detection for MIMO receivers is described. Although the example embodiments described pertain to a 2×2 system, the technique is not limited to 2×2 systems. Other embodiments of the invention may be readily implemented in arbitrary N×M systems.

We claim:

1. A method comprising:

performing a linear transformation by use of a transformation matrix W to convert a multiple-input-multiple-output communication channel matrix H into a transformed channel matrix WH and a receive signal vector r into a transformed receive signal vector Wr that allows a Euclidean distance metric to be represented in a partitioned form, wherein the Euclidean distance metric has a first partitioned term that depends on a candidate value $x_0$ for a signal transmitted from a first transmitting antenna and a second partitioned term that depends on $x_0$ and a candidate value $x_1$ for a signal transmitted from a second transmitting antenna;

initializing recursion values corresponding to terms of the first and second partitioned terms for an initial $x_0$;

using the recursion values to compute a local minimum Euclidean distance metric for the initial $x_0$ over all possible candidate values $x_1$, wherein an implicit search over all candidate values $x_1$ is provided by a slicer operation operating on the second partitioned term;

performing an ordered search over all $x_0$ values by recursively updating the recursion values and calculating subsequent local minimum Euclidean distance metrics for each value of $x_0$;

selecting a first global minimum from the local minimum Euclidean distance metrics found for $x_0$ values for each bit position, k, of a corresponding K-bit binary representation of $x_0$, where bit position k exhibits a first possible bit value, and selecting a second global minimum from the local minimum Euclidean distance metrics found for $x_0$ values for each bit position k, where bit position k exhibits a second possible bit value; and using a comparison of the first and second global minimum Euclidean distance metrics for each bit position k to determine a maximum likelihood information $L_k$ for each bit position k.

2. The method of claim 1 wherein performing the linear transformation by the use of the transformation matrix W results in the transformed channel matrix WH to have a triangular form.

3. The method of claim 2 wherein selecting the first global minimum includes storing the local minimum Euclidean distance metrics found for $x_0$ values for a given bit position k exhibiting a first possible bit value and finding the first global minimum from the stored local minimum Euclidean distance metrics for $x_0$ for the given bit position, and selecting the second global minimum includes storing the local minimum Euclidean distance metrics found for $x_0$ values for the given bit position k exhibiting a second possible bit value and finding the second global minimum from the stored local minimum Euclidean distance metrics for $x_0$ for the given bit position.

4. The method of claim 2 wherein selecting the first global minimum includes comparing each subsequent local minimum Euclidean distance metric found for $x_0$ values for a given bit position k exhibiting a first possible value with a previously computed metric and retaining a local minimum Euclidean distance metric having a smaller magnitude, and selecting the second global minimum includes comparing each subsequent local minimum Euclidean distance metric found for $x_0$ values for a given bit position k exhibiting a second possible value with a previously computed metric and retaining a local minimum Euclidean distance metric having a smaller magnitude.

5. The method of claim 2 wherein using the comparison of the first and second global minimum Euclidean distance metrics to determine the maximum likelihood information $L_k$, includes subtracting one of the first or second global minimum Euclidean distance metrics from the other to make the comparison.

6. The method of claim 2 wherein performing the linear transformation is for a channel of a 2×2 multiple-input-multiple-output system.

7. The method of claim 6 further including:

performing a linear transformation by use of a second transformation matrix $W^{(1)}$ to convert the multiple-input-multiple-output communication channel matrix H into a second transformed channel matrix $W^{(1)}H$ and the receive signal vector r into a transformed receive signal vector $W^{(1)}r$ that allows a second Euclidean distance metric to be represented in a partitioned form, wherein the second Euclidean distance metric has a third partitioned term that depends on a candidate value $x_1$ for a signal transmitted from the second transmitting antenna and a fourth partitioned term that depends on $x_1$ and a candidate value $x_0$ for a signal transmitted from the first transmitting antenna;

initializing recursion values corresponding to terms of the third and fourth partitioned terms for an initial $x_1$;

using the recursion values to compute a local minimum Euclidean distance metric for the initial $x_1$ over all possible candidate values $x_0$, wherein an implicit search over all candidate values $x_0$ is provided by a slicer operation operating on the fourth partitioned term;

performing an ordered search over all $x_1$ values by recursively updating the recursion values and calculating subsequent local minimum Euclidean distance metrics for each value of $x_1$;

selecting a third global minimum from the local minimum Euclidean distance metrics found for $x_1$ values for each bit position, k, of a corresponding K-bit binary representation of $x_1$, where bit position k exhibits the first possible bit value, and selecting a fourth global minimum from the local minimum Euclidean distance metrics found for $x_1$ values for each bit position k, where bit position k exhibits the second possible bit value; and using a comparison of the third and fourth global minimum Euclidean distance metrics for each bit position k to determine a maximum likelihood information $L_k$ for each bit position k for $x_1$.

8. The method of claim 7 wherein performing the linear transformation by the use of the transformation matrix $W^{(1)}$ results in the transformed channel matrix $W^{(1)}H$ to have a triangular form.

9. A method comprising:

performing a linear transformation by use of a transformation matrix $W^{(0)}$ to convert a multiple-input-multiple-output communication channel matrix H into a transformed channel matrix $W^{(0)}H$ and a receive signal vector r into a transformed receive signal vector $W^{(0)}r$ that allows a Euclidean distance metric to be represented in a partitioned form, wherein the Euclidean distance metric has a first partitioned term that depends on a candidate value $x_0$ for a signal transmitted from a first transmitting antenna and a second partitioned term that depends on $x_0$ and a candidate value $x_1$ for a signal transmitted from a second transmitting antenna;

initializing a first set of recursion values $u_A$, $u_B$, $u_c$ and $u_D$ corresponding to terms of the first and second partitioned terms for an initial $x_0$;

using the first set of recursion values to compute a local minimum Euclidean distance metric for the initial $x_0$ over all possible candidate values $x_1$, wherein an implicit search over all candidate values $x_1$ is provided by a slicer operation operating on the second partitioned term;

performing an ordered search over all $x_0$ values by recursively updating the first set of recursion values and calculating subsequent local minimum Euclidean distance metrics for each value of $x_0$;

selecting a first global minimum from the local minimum Euclidean distance metrics found for $x_0$ values for each bit position, k, of a corresponding K-bit binary representation of $x_0$, where bit position k exhibits a first possible bit value of 0, so that $b_k=0$, and selecting a second global minimum from the local minimum Euclidean distance metrics found for $x_0$ values for each bit position k, where bit position k exhibits a second possible bit value of 1, so that $b_k=1$; and using a comparison of the first and second global minimum Euclidean distance metrics for each bit position k to determine a maximum likelihood information $L_k$ for each bit position k for $x_0$.

10. The method of claim 9 wherein performing the linear transformation by the use of the transformation matrix $W_{(0)}$ results in the transformed channel matrix $W_{(0)}H$ to have a triangular form $$W^{(0)}H = \begin{bmatrix} a & 0 \\ b & c \end{bmatrix}.$$

11. The method of claim 10 wherein the use of the transformation matrix $W^{(0)}$ results in the transformed receive signal vector $W^{(0)}r$ to have a form $$y = \begin{bmatrix} y_0 \\ y_1 \end{bmatrix} = W^{(0)}r.$$

12. The method of claim 11 wherein performing the linear transformation to determine the maximum likelihood information $L_k$ for $x_0$ results in representing the first and second partitioned terms for use in performing the ordered search in an equation $$L_k = \left(\min_{x_0|b_k=0} - \min_{x_0|b_k=1}\right)\left(\frac{|y_0 - ax_0|^2}{K_0} + \frac{|y_1 - bx_0 - cS_M^c(y_1 - bx_0)|^2}{K_1}\right)$$
$$= \left(\min_{x_0|b_k=0} - \min_{x_0|b_k=1}\right)\left(\frac{|y_0 - ax_0|^2}{|H_{11}|^2\sigma_0^2 + |H_{01}|^2\sigma_1^2} + \frac{|y_1 - bx_0 - cS_M^c(y_1 - bx_0)|^2}{|H_{11}|^2\sigma_0^2 + |H_{01}|^2\sigma_1^2}\right)$$

to which the first and second global minimum Euclidean distance metrics are compared for $x_0$, where 94 $_0^2$ and $\sigma_1^2$ represent variances of noise in the channel H, and $S_M^c(y_1 - bx_0)$ is the slicer operation for $x_0$.

13. The method of claim 12 wherein initializing the first set of recursion values includes computing $u_A$, $u_B$, $u_C$, $u_D$ in the form $$u_A(i)=Re(y_1-bx_0(i))$$
$$u_B(i)=Im(y_1-bx_0(i))$$
$$u_C(i)=Re(y_0-ax_0(i))$$
$$u_D(i)=Im(y_0-ax_0(i))$$

for $x_0$.

14. The method of claim 13 wherein performing the ordered search over $x_0$ utilizes updated first set of recursion values to compute each local minimum Euclidean distance metric e(i) by computing $$L_k(i) = \left(\min_{x_0|b_k=0} - \min_{x_0|b_k=1}\right)\left(\frac{|u_C(i) + ju_D(i)|^2}{|H_{11}|^2\sigma_0^2 + |H_{01}|^2\sigma_1^2} + \right.$$
$$\left.\frac{|u_A(i) + ju_B(i) - cS_M^c(u_A(i) + ju_B(i))|^2}{|H_{11}|^2\sigma_0^2 + |H_{01}|^2\sigma_1^2}\right)$$
$$= \left(\min_{x_0|b_k=0} - \min_{x_0|b_k=1}\right)e(i)$$

where $$e(i) = \left(\frac{|u_C(i) + ju_D(i)|^2}{|H_{11}|^2\sigma_0^2 + |H_{01}|^2\sigma_1^2} + \frac{|u_A(i) + ju_B(i) - cS_M^c(u_A(i) + ju_B(i))|^2}{|H_{11}|^2\sigma_0^2 + |H_{01}|^2\sigma_1^2}\right)$$

for $x_0$.

15. The method of claim 14 wherein selecting the first global minimum includes storing the local minimum Euclidean distance metrics found for $x_0$ values for a given $b_k=0$ and finding the first global minimum from the stored local minimum Euclidean distance metrics for $x_0$ for $b_k=0$, and selecting the second global minimum includes storing the local minimum Euclidean distance metrics found for $x_0$ values for the given $b_k=1$ and finding the second global minimum from the stored local minimum Euclidean distance metrics for $x_0$ for the given $b_k=1$.

16. The method of claim 14 wherein selecting the first global minimum includes comparing each subsequent local minimum Euclidean distance metric found for $x_0$ values for a given $b_k=0$ with a previously computed metric and retaining a local minimum Euclidean distance metric having a smaller magnitude, and selecting the second global minimum includes comparing each subsequent local minimum Euclidean distance metric found for $x_0$ values for a given $b_k=1$ with a previously computed metric and retaining a local minimum Euclidean distance metric having a smaller magnitude.

17. The method of claim 14 wherein using the comparison of the first and second global minimum Euclidean distance metrics to determine the maximum likelihood information $L_k$, includes subtracting one of the first or second global minimum Euclidean distance metric from the other to make the comparison in the form $$\left(\min_{x_0|b_k=0} - \min_{x_0|b_k=1}\right)e(i)$$

in which a positive or negative result determines if the bit is more likely a 1 or 0.

18. The method of claim 14 further including:
performing a linear transformation by use of a second transformation matrix $W^{(1)}$ to convert the multiple-input-multiple-output communication channel matrix H into a second transformed channel matrix $W^{(1)}H$ and the receive signal vector r into a transformed receive signal vector $W^{(1)}r$ that allows a second Euclidean distance metric to be represented in a partitioned form, wherein the second Euclidean distance metric has a third partitioned term that depends on a candidate value $x_1$ for a signal transmitted from the second transmitting antenna and a fourth partitioned term that depends on $x_1$ and a candidate value $x_0$ for a signal transmitted from the first transmitting antenna;
initializing a second set of recursion values $u_A$, $u_B$, $u_C$ and $u_D$ corresponding to terms of the third and fourth partitioned terms for an initial $x_1$;
using the second set of recursion values to compute a local minimum Euclidean distance metric for the initial $x_1$ over all possible candidate values $x_0$, wherein an implicit search over all candidate values $x_0$ is provided by a slicer operation operating on the fourth partitioned term;
performing an ordered search over all $x_1$ values by recursively updating the recursion values and calculating subsequent local minimum Euclidean distance metrics for each value of $x_1$;
selecting a third global minimum from the local minimum Euclidean distance metrics found for $x_1$ values for each bit position, k, of a corresponding K-bit binary representation of $x_1$, where bit position k exhibits the first possible bit value, and selecting a fourth global minimum from the local minimum Euclidean distance metrics found for $x_1$ values for each bit position k, where bit position k exhibits the second possible bit value; and
using a comparison of the third and fourth global minimum Euclidean distance metrics for each bit position k to determine a maximum likelihood information $L_k$ for each bit position k for $x_1$.

19. The method of claim 18 wherein performing the linear transformation by the use of the transformation matrix $W^{(1)}$ results in the transformed channel $W^{(1)}H$ to have a triangular form $$W^{(1)}H = \begin{bmatrix} 0 & k \\ 1 & m \end{bmatrix}$$

and wherein use of the transformation matrix $W^{(1)}$ results in the transformed receive vector $W^{(1)}r$ to have a form $$z = \begin{bmatrix} z_0 \\ z_1 \end{bmatrix} = W^{(1)}r;$$

and performing the linear transformation to determine the maximum likelihood information $L_k$ for $x_1$ results in representing the first and second partitioned terms for use in performing the ordered search in an equation $$L_k = \left(\min_{x_1|b_k=0} - \min_{x_1|b_k=1}\right)\left(\frac{|z_0 - kx_1|^2}{K_2} + \min_{x_0}\frac{|z_1 - lx_0 - mx_1|^2}{K_3}\right)$$
$$= \left(\min_{x_1|b_k=0} - \min_{x_1|b_k=1}\right)\left(\frac{|z_0 - kx_1|^2}{K_2} + \frac{|z_1 - mx_1 - lS_M^l(z_1 - mx_1)|^2}{K_3}\right)$$

to which the first and second global minimum Euclidean distance metrics are compared for $x_1$, where $\sigma_0^2$ and $\sigma_1^2$ represent variances of noise in the channel H, and $S^1_M(z_1 - mx_1)$ is the slicer operation for $x_1$.

* * * * *

UNITED STATES PATENT AND TRADEMARK OFFICE
CERTIFICATE OF CORRECTION

| | |
|---|---|
| PATENT NO. | : 7,542,743 B2 |
| APPLICATION NO. | : 11/525270 |
| DATED | : June 2, 2009 |
| INVENTOR(S) | : Joseph Paul Lauer et al. |

It is certified that error appears in the above-identified patent and that said Letters Patent is hereby corrected as shown below:

Column 21, line 56, in Claim 10: the "(0)" should be a superscript and not a subscript of "W"

Column 21, line 57, in Claim 10: the "(0)" should be a superscript and not a subscript of "W"

Signed and Sealed this

Twenty-first Day of July, 2009

JOHN DOLL
*Acting Director of the United States Patent and Trademark Office*